United States Patent Office 3,101,988
Patented Aug. 27, 1963

3,101,988
PROCESS FOR THE DYEING OF POLYMERIC SYNTHETIC MATERIAL AND MATERIAL DYED THEREWITH
Werner Bossard, Riehen, near Basel, and Jacques Voltz and François Favre, Basel, Switzerland, assignors to J. R. Geigy A.G., Basel, Switzerland
No Drawing. Filed Dec. 1, 1955, Ser. No. 550,477
Claims priority, application Switzerland Dec. 15, 1954
16 Claims. (Cl. 8—41)

The present invention concerns a dyeing process for polymeric synthetic materials in the form of fibres, films, threads or tapes consisting of polyacrylonitrile or which are produced chiefly from acrylonitrile. It concerns a dyeing process using aqueous solutions of such un-sulphonated azo dyestuffs which contain at least one cyclammonium group. "Dyeing" here and in the following is to be understood as local dyeing such as is used in calico printing. The invention also concerns, as industrial product, the material dyed or printed according to the new dyeing method.

At first there seemed to be insuperable difficulties in the dyeing of polyacrylonitrile fibres with the usual water soluble textile dyestuffs of the azo series. The affinity of the sulphonated azo dyestuffs to the new fibres and the fastnesses of the dyeings attained therewith proved to be completely insufficient. Recently, it is true that dyeing processes for polyacrylonitrile fibres have become known which, using the usual sulphonated azo dyestuffs enable polyacrylonitrile to be dyed from an aqueous solution in the presence of cupro ions, but it is difficult to attain level dyeings in the presence of cupro ions. This disadvantage is, therefore, very great because the unevenness of the finished dyeing can hardly be corrected afterwards.

It has now been found that polymeric and copolymeric synthetic materials in the form of fibres, threads, films or tapes as well as textiles made up therefrom which consist wholly or chiefly of derivatives of acrylic acid containing nitrogen, in particular of polyacrylonitrile, can be dyed evenly in an aqueous liquor with good exhaustion of the baths in very pure and fast shades if azo dyestuffs are used which do not contain acid dissociating groups but which have at least one cyclammonium group in the molecule.

By cyclammonium group is meant, as is usual, a nitrogen-containing hetero ring in which a tertiary nitrogen atom is quaternised by alkylation. In contrast to the sulphonated azo dyestuffs used up to now, the azo dyestuffs used according to the present application with a cyclammonium group, contain the dyestuffs as cation.

The cyclammonium group can be in external substituents such as in the pyridinium acetylamino azobenzene compounds of the German patent specification 473,526 which were recommended for the dyeing of silk. Much more advantageous results however, are obtained with azo dyestuffs in which the co-ordinative unsaturated ammonium nitrogen atom of the cyclammonium group forms a resonance system with the arylazo group, this nitrogen atom being bound by an uninterrupted chain of conjugated double linkages with the auxochromic hydroxyl or amino group of the arylazo radical. The arylazo radical can be bound to the cyclammonium group by means of a p-phenylene radical such as in the 2-(p-arylazophenyl)-N-alkyl benzthiazolium salts. Particularly pure, very fast to wet and light dyeings are obtained however, by using such azo dyestuffs in which the arylazo radical is bound direct to a carbon atom in the ring of the cyclammonium group which is in a neighbouring position to a nitrogen atom in the ring. Advantageously the arylazo radical is a p-hydroxy and, in particular, a p-aminoarylazo radical. Dyestuffs are particularly valuable which have a p-aminophenylazo radical. The amino group in the p-position can be primary, secondary or tertiary. The N substituents of the amino group can be of the aliphatic, araliphatic, cycloaliphatic or aromatic series. Hydrogenated hetero rings can form the amino group in the p-position such as, for example, in the piperidino and morpholino compounds. If necessary, the p-aminophenyl radical of the arylazo group can also be a component of a condensed ring system which, as in the 1.2.3.4-tetrahydro quinolines, in lilolidine, julolidine or in the 1.8-perimidines, consists of an iso-cyclic-aromatic ring and a fused, nitrogen-containing, hydrogenated hetero ring. Within the bounds of the definition, the azo dyestuffs can contain any substituents desired which are usual in azo dyestuffs, for example, aromatic rings can be substituted with halogen, alkyl, alkoxy, hydroxyl, amino, substituted amino, acyl-amino, nitro, carboxylic acid ester, carboxylic acid amide, alkyl sulphonyl, aryl sulphonyl, sulphonic acid ester or sulphonic acid amide groups and aliphatic substituents of amino groups can be substituted for example by halogen, hydroxyl, alkoxy or cyano groups.

The cyclammonium group can be derived from 6-membered or, advantageously, from 5-membered aromatic, nitrogen-containing hetero ring, in particular however, from N-alkyl-azolium rings. These rings can be a part of an isocyclic-heterocyclic condensed system. The nitrogen-containing hetero rings can also contain further hetero atoms, for example, further nitrogen or oxygen, sulphur, selenium, possibly combined with another nitrogen atom. For example, the pyridine, pyrazole, imidazole, triazole, tetrazole, oxazole, thiazole, selenazole, oxdiazole, thiadiazole, pyrimidine or the triazine ring, also the quinoline, indazole, benzimidazole, naphthimidazole, benzoxazole, naphthoxazole, benzthiazole, naphthothiazole, benzoselenazole ring can form or contain the cyclammonium group.

Some of the dyestuffs usable according to the present invention containing cyclammonium groups are known, the production of others forms the subject matter of co-pending applications. They are produced from azo dyestuffs containing a hetero ring with a tertiary nitrogen atom in the ring but which do not contain any acid dissociating substituents such as sulphonic acid or carboxyl groups, by reacting such dyestuffs, advantageously in inert organic solvents, while heating with esters of low alcohols, with strong inorganic or organic acids or with benzyl halides. Examples of organic solvents are higher boiling aliphatic, cycloaliphatic or aromatic hydrocarbons and inert halogen or nitro hydrocarbons. Example of esters of low alcohols with strong acids are, e.g. the methyl, ethyl, propyl or butyl esters of hydrogen chloride, hydrogen bromide, hydrogen iodide, sulphuric acid, benzene sulphonic acid or toluene sulphonic acids. The dyestuffs used according to the present invention containing cyclammonium groups are generally more or less neutral salts of strong inorganic or organic acids and they form aqueous solutions which contain the azo dyestuff as cation. They can also be betaine-like compounds which are soluble in diluted acids, in particular if a p-hydroxyarylazo radical is bound in the neighbouring position to the quaternised nitrogen ring atom. They can also be used as double salts with inorganic salts, such as, e.g. as zinc chloride double salts.

The starting materials for the production of the azo dyestuffs usable according to the present invention with at least one cyclammonium group are obtained for example by condensing nitrosoaryl compounds with primary heterocyclic amino compounds, for example using, by methods known per se, p-nitrosophenols, p-nitrosonaphthols, p-nitrosodialkyl anilines, p-nitrosodiphenylamines and 2-aminopyridines, 2-aminoquinolines, 2- or 4-aminopyrimidines, 2-aminoquinoxalines, 2-amino-1.3.5-triazines, 2-amino-oxazoles, 2-aminobenzoxazoles, 2-aminoimidazoles. It is more advantageous to produce them from diazotisable aminoheterocycles by azo coupling with azo components substituted as desired but within the bounds of the definition, in particular by using azo components coupling in the p-position to a hydroxyl group and preferably to a possibly substituted amino group. Examples of diazo components are 3-aminopyrazoles, 2-aminothiazoles, 2-aminoselenazoles, 3-amino-1.2.4-triazoles, 5-aminotetrazoles, 2-amino-1.3.4-oxdiazoles, 2-amino-1.3.4-thiadiazoles, 2-amino-1.3.5-thiadiazoles and possibly, benzo or naphtho compounds thereof, for example 2-aminobenzo- or 2-aminonaphtho-thiazoles, 2-aminobenzo- or 2-aminonaphtho-selenazole, 3-aminoindazole.

However, in the process according to the present invention, also the known dyestuffs can be used which are obtained from diazotised 2-(4'-aminophenyl)-3-alkyl-benzthiazolium salts and unsulphonated azo components, advantageously azo components of the benzene series coupling in p-position to a possibly substituted amino group.

Insofar as they are in the form of salts of strong inorganic or organic acids which form more or less neutral aqueous solutions, the azo dyestuffs with a cyclammonium group usable according to the present invention can be dyed from a weakly alkaline, neutral or weakly acid bath. It is of advantage to dye from an acid bath by either adding the necessary acid, for example, acetic acid, formic acid, tartaric acid, naphthalene sulphonic acid, alkali bisulphate, sulphuric acid, acid alkali phosphates or phosphoric acid, previously to the dyebath or by adding substances to the dyebath which produce acid during the dyeing process. Salts of volatile bases with strong non-volatile acids are examples of substances which produce acid, such as, for example, ammonium sulphate or water soluble esters of organic acids which are saponified during the dyeing process, such as, for example the methyl or ethyl esters of aliphatic hydroxyacids, e.g. lactic, malic acid or tartaric acid. When mineral acid solutions of the dyestuffs usable according to the present invention are used for dyeing, which is the case with betaine-like compounds, the mineral acid can also be neutralised during the dyeing process by the gradual addition of alkali salts of weaker acids, e.g. with sodium acetate. Dyeing is performed in the heat, at boiling temperature of the liquor in an open vessel or in closed vessels under pressure, possibly at temperatures of over 100° C. The azo dyestuffs used according to the present invention, in particular the monoazo dyestuffs, have a good affinity to polyacrylonitrile fibres or fibres from copolymers which are produced chiefly from acrylonitrile. Under the usual dyeing conditions described, the baths are considerably exhausted within normal dyeing times and very level, generally very pure, very good wet fast and often excellently fast to light dyeings are obtained.

The following examples illustrate the invention. Where not otherwise stated, parts are given as parts by weight. The temperatures are in degrees centigrade. The relationship of parts by weight to parts by volume is as that of kilogrammes to litres.

*Example 1*

0.5 part of the monoazo dyestuff of the formula:

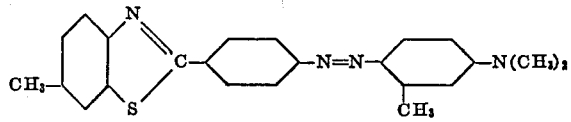

made soluble by reacting with dimethyl sulphate is pasted in 0.5 part of 80% acetic acid and dissolved by the addition of 4000 parts of hot water. A further 1.0 part of 80% acetic acid, 2 parts of sodium acetate and 4 parts of a condensation product from olein alcohol and 15 mols of ethylene oxide are added. 100 parts of polyacrylonitrile fibres are entered at 50°, the temperature of the bath is heated to 90° within 30 minutes, dyeing is performed for 10 minutes at this temperature, the bath is then brought to the boil and dyeing is continued at the boil for 1 hour. The dyebath is almost completely exhausted after this time. The goods so dyed are soaped at 80° for 15 minutes in 5000 parts of water with 5 parts of a sulphonated fatty acid condensation product, rinsed and dried. The fibres are dyed in full wine red shades which have excellent fastness to water and light.

If, instead of the dyestuff of the above formula, one of the dyestuffs given in the following table is used and dyeing is performed as described in this example, then also very fast dyeings on polyacrylonitrile fibres are obtained.

| No. | Diazonium compound from— | Coupling component | Alkylating agent | Dyeing on polyacrylonitrile fibres |
|---|---|---|---|---|
| 1 | 2-(4'-amino-phenyl)-6-methyl benzthiazole. | 2-naphthol | Bromethyl | Orange. |
| 2 | ----do---- | 1-acetoacetylamino-2-methylbenzene. | Dimethyl sulphate | Yellow. |
| 3 | ----do---- | 3-methyl-5-pyrazolone | Benzene sulphonic acid ethyl ester. | Do. |
| 4 | ----do---- | 1-phenyl-3-methyl-5-pyrazolone. | Dimethyl sulphate | Do. |
| 5 | ----do---- | 1.3-diaminobenzene | Diethyl sulphate | Brown violet. |
| 6 | ----do---- | 2-aminonaphthalene | ----do---- | Wine red. |
| 7 | ----do---- | N.N-diethylamine-benzene. | Benzyl bromide | Do. |
| 8 | 2-(3'-methyl-4'-amino-phenyl)-4.6-dimethyl-benzthiazole. | 1-amino-2-methoxy-5-methylbenzene. | Dimethyl sulphate | Bordeaux. |

*Example 2*

0.5 part dye salt obtained by ethylating the monoazo dyestuff of the formula:

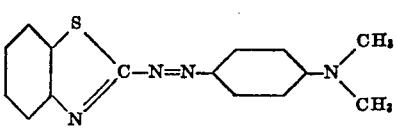

is pasted in 0.5 part of 80% acetic acid and then taken up in 4,000 parts of water. A further 2 parts of sodium acetate, 1 part of 80% acetic acid and 4 parts of a condensation product from olein alcohol and 15 mols of ethylene oxide are added to this solution. 100 parts of polyacrylonitrile fibres are entered at 50°, the temperature of the bath is raised within 30 minutes to 90°, kept at this temperature for 10 minutes and then dyeing is performed at the boil for 1 hour. The dyebath is considerably exhausted. The dyed goods are thoroughly soaped as described in Example 1. Polyacrylonitrile fibres in pure blue shades which have excellent fastness properties are obtained by this process. Similar dyeings on polyacrylonitrile fibres are obtained by using the dyestuffs or the correspondingly formed benzselenazolyl azo compounds given in the following table.

is pasted with 0.5 part of 80% acetic acid and dissolved by the addition of 4000 parts of hot water. A further 1 part of 80% acetic acid, 2 parts of sodium acetate and 4 parts of a condensation agent from olein alcohol and 15 mols of ethylene oxide are added. 100 parts of polyacrylonitrile fibres are entered. The bath is heated to 90° within 30 minutes, kept at this temperature for 10

| No. | Diazonium compound from— | Coupling component | Alkylating agent | Dyeing on polyacrylonitrile fibres |
|---|---|---|---|---|
| 1 | 2-aminobenzthiazole | N.N-diethylamino benzene. | Dimethyl sulphate | Blue. |
| 2 | do | N.N-di-(β-hydroxyethyl)-aminobenzene. | p-Toluene sulphonic acid methyl ester. | Do. |
| 3 | do | N-methyl-N-β-cyanethyl-aminobenzene. | do | Do. |
| 4 | 2-aminothiazole | 1-amino-2.5-dimethoxybenzene. | do | Reddish blue. |
| 5 | do | 1-amino-2-methoxy-5-methylbenzene. | do | Do. |
| 6 | 2-amino-5-methoxy-thiazole. | 1-amino-3-methyl-benzene. | Benzyl bromide | Do. |
| 7 | 2-aminothiazole | N.N-dimethyl-1-amino-naphthalene. | Methyl chloride | Blue. |
| 8 | 2-aminobenzthiazole | 2-aminonaphthalene | Ethyl bromide | Brown-red. |
| 9 | 2-amino-4-methyl-5-ethyl thiazole. | N.N.-diethylaminobenzene. | Dimethyl sulphate | Blue. |
| 10 | 2-aminothiazole | Hydroxybenzene | Ethyl iodide | Orange. |
| 11 | do | 1-phenyl-3-methyl-5-aminopyrazolone. | do | Yellow-brown. |
| 12 | 2-aminobenzthiazole | N-ethyl-N-benzylamino-benzene. | Dimethyl sulphate | Reddish blue. |
| 13 | do | N.N-dibenzylaminobenzene. | do | Do. |
| 14 | 2-amino-6-methoxy-benzthiazole. | 1-amino-3-chlorobenzene | Ethyl bromide | Blue. |
| 15 | 2-aminothiazole | 1.N-phenylaminonaphthalene. | Dimethyl sulphate | Do. |
| 16 | 2-aminothiazole | 1.2.3.4-tetrahydro-3-hydroxy-7.8-benzoquinoline. | do | Do. |
| 17 | 2-amino-4-methylthiazole | N.N-diethylaminobenzene. | Diethyl sulphate | Blue-violet. |
| 18 | 2-amino-4.5-diphenyl-thiazole. | do | do | Blue. |
| 19 | 2-amino-4-phenyl thiazole | do | do | Do. |
| 20 | 2-aminothiazole | N-methyl-diphenylamine | Dimethyl sulphate | Do. |
| 21 | 2-aminobenzthiazole | 1.2.3.4-tetrahydro-5.6-benzoquinoline. | do | Do. |
| 22 | do | N.methyl-diphenylamine | do | Do. |
| 23 | do | 1-N.N-dimethylamino-3-nitrobenzene. | do | Do. |
| 24 | 2-amino-6-methoxybenz-thiazole. | 1-amino-2.5-dimethoxybenzene. | Ethyl bromide | Do. |
| 25 | do | Diphenylamine | Dimethyl sulphate | Do. |
| 26 | do | N-methyl-diphenylamine | do | Do. |
| 27 | 2-amino-4.5-dimethyl thiazole. | do | Diethyl sulphate | Do. |
| 28 | 2-amino-(naphtho-1'.2':4.5)-thiazole. | N-ethyl-N-benzylamino-benzene. | p-Toluene sulphonic acid methyl ester. | Do. |
| 29 | do | N.N-diethylamino-3-methylbenzene. | do | Do. |
| 30 | 2-aminothiazole→1-amino-3-methyl-benzene, subsequently acetylated. | | do | Brown. |
| 31 | 2-aminothiazole | 2-methyl-8-hydroxyliloli-dine. | do | Blue. |
| 32 | 2-aminobenzthiazole | 1-methyl-2-phenyl indole | Dimethyl sulphate | Violet. |
| 33 | 2-aminothiazole | Pyrrole | do | Blue. |

Equivalent dyeings are obtained with the zinc chloride double salts of the above dyestuffs.

*Example 3*

The following dyebath is prepared: 0.5 part of the azo dyestuff converted into the soluble dye salt with dimethyl sulphate, 3-amino-1.2.4 - triazole→N.N-diethylaminobenzene of the formula:

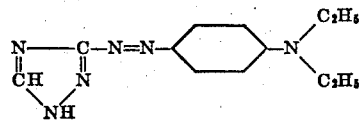

minutes and then dyeing is performed at the boil for 1 hour. The dyebath is almost completely exhausted. The goods dyed in this manner are then soaped for 15 minutes at 80° in 5000 parts of water with the addition of a sulphonated fatty acid condensation product, rinsed and dried. The polyacrylonitrile fibres are dyed in pure red shades which have excellent fastness to washing and light.

If, instead of the dyestuff of the above formula, one of the dyestuffs given in the following table is used and otherwise the same procedure as described in this example is followed, then very fast dyeings on polyacrylonitrile fibres are also obtained.

| No. | Diazonium compound from— | Coupling component | Alkylating agent | Dyeing on polyacrylonitrile fibres |
|---|---|---|---|---|
| 1 | 3-amino-1.2.4-triazole | N,N-dimethylaminobenzene | Dimethyl sulphate | Red. |
| 2 | ...do | N,N-dioxethylaminobenzene | p-Toluene sulphonic acid methyl ester | Do. |
| 3 | ...do | N-ethyl-N-benzylaminobenzene | Butyl chloride | Do. |
| 4 | ...do | Phenol | Dimethyl sulphate | Yellow. |
| 5 | ...do | N-ethyl-N-benzylaminobenzene | ...do | Do. |
| 6 | ...do | N,N-diethylaminobenzene | ...do | Do. |
| 7 | ...do | 1-N,N-dimethylamino-3-methoxybenzene | Diethyl sulphate | Yellowish red. |
| 8 | ...do | 1-N,N-dimethylamino-3-chlorobenzene | Dimethyl sulphate | Red. |
| 9 | ...do | 2-naphthol | p-Toluene sulphonic acid methyl ester | Orange. |
| 10 | 3-methyl-5-amino-1.2.4-triazole | N-ethyl-N-benzylaminobenzene | ...do | Red. |
| 11 | ...do | 1-N,N-dimethylamino-3-methylbenzene | Dimethyl sulphate | Do. |
| 12 | ...do | 4-phenyl morpholine | Diethyl sulphate | Do. |
| 13 | 3-amino-1.2.4-triazole | 1-phenyl-3-methyl-5-amino pyrazole | Dimethyl sulphate | Yellow. |

Identical dyeings are obtained if instead of the simple dye salts, the double salts thereof with inorganic salts Similar dyeings are obtained with the dyestuffs listed in the following table:

| No. | Diazonium compound from— | Coupling component | Alkylating agent | Dyeing on polyacrylonitrile fibres |
|---|---|---|---|---|
| 1 | 3-aminoindazole | N,N-dimethylaminobenzene | Dimethyl sulphate | red. |
| 2 | ...do | 1-N,N-diethylamino-2-methoxy-5-methylbenzene | Methyl iodide | Blue-red. |
| 3 | ...do | Hydroxybenzene | Dimethyl sulphate | Yellow brown. |
| 4 | ...do | N-ethyl-N-benzyl-aminobenzene | ...do | Red-blue. |
| 5 | 4-methyl-3-aminoindazole | 1-N,N-diethylamino-3-carbethoxybenzene | Diethyl sulphate | Do. |
| 6 | ...do | 1-amino-3-methylbenzene | p-Toluene sulphonic acid methyl ester | Ruby. |
| 7 | 4-chloro-3-aminoindazole | 1-N,N-diethylamino-3-methylbenzene | Diethyl sulphate | Blue-red. | such as, e.g. zinc chloride, are used.

*Example 4*

0.5 part of the cyclammonium salt which is obtained from the dyestuff of the formula:

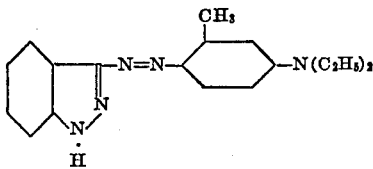

by quaternising with dimethyl sulphate, is pasted with 0.5 part of 80% acetic acid and dissolved by the addition of 4000 parts of hot water. A further 1 part of 80% acetic acid, 2 parts of sodium acetate and 4 parts of a condensation agent from olein alcohol and 15 mols of ethylene oxide are added. 100 parts of polyacrylonitrile are entered. The temperature of the bath is raised within 30 minutes to 90°, kept at this temperature for 10 minutes and then dyeing is performed at the boil for 1 hours. The dyebath is almost completely exhausted. The goods dyed in this manner are then soaped for 15 minutes at 80° in 5000 parts of water with the addition of a sulphonated fatty acid condensation product, rinsed and dried. The polyacrylonitrile fibres are dyed in pure violet shades which have excellent fastness to washing and light.

*Example 5*

The following dyebath is prepared: 0.5 part of the azo dyestuff of the constitution:

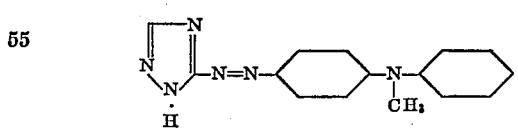

made soluble with dimethyl sulphate and 3 parts of ammonium sulphate are dissolved hot in 4000 parts of water. Polyacrylonitrile fibres are dyed in this bath. 100 parts are entered at 45°, the temperature of the bath is raised to 90° within 15 minutes, kept for 10 minutes at this temperature and then the bath is exhausted at the boil for 45 minutes. A vivid red and very fast dyeing is obtained.

The process can also be modified by dyeing in a mineral acid dyebath and slowly neutralising the mineral acid reaction of the bath with sodium acetate while dyeing. Very level red dyeings with excellent fastness properties are obtained according to both processes. Further dyestuffs which can be dyed according to the methods described are given in the following table.

| No. | Diazonium compound from— | Coupling component | Alkylating agent | Dyeing on polyacrylonitrile fibres |
|---|---|---|---|---|
| 1 | 3-amino-1.2.4-triazole | N-ethyl-N-benzylaminobenzene. | Dimethyl sulphate | Red. |
| 2 | ___do___ | 1-N.N-dimethylamino-3-methylbenzene. | ___do___ | Do. |
| 3 | ___do___ | 1-N.N-dimethylamino-2-methoxy-5-acetaminobenzene. | p-Toluene sulphonic acid methyl ester. | Scarlet. |
| 4 | 3-amino-5-methyl-1.2.4-triazole. | N.N-diethlaminobenzene | Ethyl bromide | Red. |
| 5 | ___do___ | 1-N.N-dimethylamino-3-methoxybenzene. | Dimethyl sulphate | Scarlet. |
| 6 | ___do___ | Phenol | ___do___ | Yellow. |

*Example 6*

By alkylating the monoazo dyestuffs of the formula:

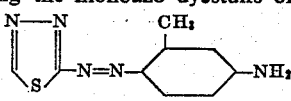

with dimethyl sulphate a water soluble dye salt is obtained. 0.5 part of this dye salt is dissolved by the addition of 4000 parts of hot water and 4 parts of a condensation product from hexadecyldiethylentriamine and 20 mols of ethylene oxide are added to the solution. 100 parts of polyacrylonitrile fibres are entered at 45° into the bath so prepared. The temperature of the bath is raised to 90° within 15 minutes, kept at this temperature for 10 minutes and then dyeing is continued for 30 minutes at the boil. A brilliant ruby red dyeing which has excellent fastness properties is obtained in this way. If the dyestuffs given in the following table are dyed under the same conditions, then very fast dyeing on polyacrylonitrile fibres are also obtained.

| No. | Diazonium compound from— | Coupling component | Alkylating agent | Dyeing on polyacrylonitrile fibres |
|---|---|---|---|---|
| 1 | 2-aminopyridine | 2-naphthol | Dimethyl sulphate | Violet. |
| 2 | 2-aminoquinoline | 1-naphthol | ___do___ | Brown-violet. | dyeing is performed under the same temperature and time conditions as given in Example 1. The dyed goods after soaping with a fatty acid sulphonate and well rinsing, have a violet shade which has good fastness properties. Dyeings with similar properties are obtained under the same conditions with the dyestuffs given in the following table.

The dyestuff to be methylated is obtained according to Tschitschibabin (Chemisches Centralblatt, vol. 1916, II, 228; Chemisches Centralblatt, vol. 1916, III, 1021).

*Example 8*

0.5 part of the cyclammonium salt obtained from the dyestuff of the formula:

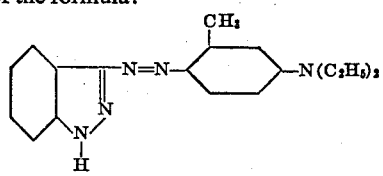

by quaternising with dimethyl sulphate is dissolved in 2,500 parts of water which contain 2 parts of sodium acetate and 1 part of the sodium salt of μ-heptadecyl-N-benzyl-benzimidazole disulphonic acid. 100 parts of polyacrylonitrile fibres are entered into the ruby red dyebath at 55°, the temperature of the bath is raised to 95–97° within 30 minutes and dyeing is performed at this temperature for 1 hour. The bath is considerably exhausted after this time.

The rinsed goods are soaped, again rinsed and dried. A strong, very vivid and fast violet dyeing is obtained in this way. If the analogous dyestuffs are used which contain the radical of N-ethyl-benzylaminobenzene or of N-diethylaminobenzene instead of that of p-diethylamino-o-methylbenzene, then ruby red or blueish red dyeings are obtained which have the same good fastness properties.

Dyestuffs used in an analogous manner can also contain the 4-methyl indazolyl-3-radical instead of the 3-indazolyl radical.

| No. | Diazonium compound from— | Coupling component | Alkylating agent | Dyeing on polyacrylonitrile fibres |
|---|---|---|---|---|
| 1 | 2-amino-1.3.4-thiodiazole | 1-N.N-dimethylamino-2.5-dimethoxybenzene. | p-Toluene sulphonic acid methyl ester. | Ruby red. |
| 2 | ___do___ | (5'-hydroxynaphtho-1'.2':2.3)-1.4.5.6-tetrahydropyridine. | Dimethyl sulphate | Do. |
| 3 | 2-amino-5-methyl-1.3.4-thiodiazole. | N.N-dimethylaminobenzene. | ___do___ | Violet |
| 4 | ___do___ | N-ethyl-N-benzylaminobenzene. | p-Toluene sulphonic acid methyl ester. | Do. |
| 5 | ___do___ | 1-amino-3-methylbenzene | Diethyl sulphate | Red-violet. |

More red shades are obtained with the oxdiazolyl-1.3.4-azo dyestuffs of an analogous construction.

*Example 7*

0.5 part of the monoazo dyestuff made soluble by reaction with diethyl sulphate of the constitution:

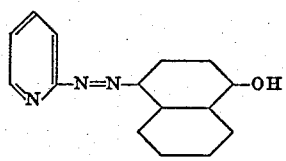

is dissolved with 3000 parts of hot water. 1 part of crystallised sodium carbonate and 2.5 parts of a condensation product from p-tert. amylphenol with 15 mols of ethylene oxide are added to this solution. 100 parts of polyacrylonitrile fibres are entered at 45° into this bath and

Example 9

0.5 part of the cyclammonium salt of the dyestuff of the formula:

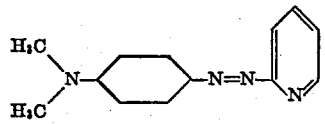

which is obtained from the known monoazo dyestuff (see J. Am. Chem. Soc. 73, p. 5606 (1951)) by reacting with p-toluene sulphonic acid methyl ester, is dissolved in 3000 parts of water. A further 3 parts of 83% phosphoric acid are added and 100 parts of polyacrylonitrile fibres are entered at 45°. The temperature of the bath is raised to 90° and dyeing is performed for 1 hour until the bath is exhausted. A strong fast to light violet dyeing is obtained in this way.

Dyeings with similar properties are obtained with the dyestuffs given in the following table.

| No. | Amine | Nitroso compound | Alkylating agent | Dyeing on polyacrylonitrile fibres |
|---|---|---|---|---|
| 1 | 2-aminoquinoline | N.N-dimethylamino-4-nitrosobenzene. | Dimethyl sulphate | Violet. |
| 2 | 2-methyl-6-aminopyridine | do | do | Do. |
| 3 | 2-amino-4-methylpyridine | do | do | Do. |
| 4 | 2-aminoquinoline | N.N-diethylamino-4-nitrosobenzene. | p-toluene sulphonic acid methyl ester. | Do. |
| 5 | do | N-ethyl-N-benzyl-amino-4-nitrosobenzene. | do | Do. |

Dye salts with similar dyeing properties are obtained if pyridinyl-3-azo compounds are used as starting materials. These are produced by diazotising 3-aminopyridine and then coupling with N.N-dimethylaminobenzene or N-ethyl-N-benzylaminobenzene.

Example 10

1 part of the cyclammonium salt of the formula:

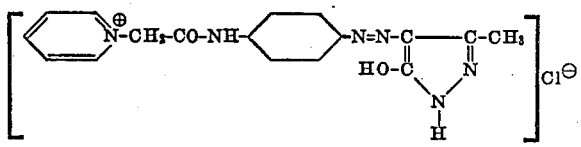

is dissolved in 2000 parts of hot water. 2 parts of sodium acetate are added to the dyebath. 100 parts of polyacrylonitrile fibres are entered at 45° into the bath so prepared, the temperature of the bath is brought to the boil within 15 minutes and dyeing is performed as given in Example 1. The goods which are dyed yellow have good properties.

If in the above Example 1 part of the analogous dyestuff with 2-naphthol as azo component is used, then beautiful, vivid, scarlet red shades are obtained.

Example 11

0.5 part of the cyclammonium compound obtained from the monoazo dyestuff of the formula:

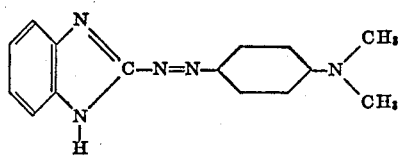

by quaternising with dimethyl sulphate is pasted with 0.5 part of 80% acetic acid and dissolved by the addition of 4000 parts of hot water. A further 1 part of 80% acetic acid, 2 parts of sodium acetate and 4 parts of a condensation agent from olein alcohol and 15 mols of ethylene oxide are added and 100 parts of polyacrylonitrile fibres are entered. The bath is heated to 90° within 30 minutes, kept at this temperature for 10 minutes and then dyeing is performed at the boil for 1 hour. The bath is almost completely exhausted. The goods so dyed are then soaped for 15 minutes at 80° in 5000 parts of water with the addition of a sulphonated fatty acid condensation product, rinsed and dried. The polyacrylonitrile fibres are dyed in pure red shades which have excellent fastness to washing and light.

The above dyestuff is produced by condensation of 2-amino-benzimidazole with 4-N.N-dimethylaminonitrosobenzene in inert solvents at a raised temperature.

Similar dyeings are obtained with the dyestuffs listed below.

| No. | Amine | Nitroso compound | Alkylating agent | Dyeing on polyacrylonitrile fabrics |
|---|---|---|---|---|
| 1 | 2-aminobenzimidazole | 4-N.N-diethylamino-nitrosobenzene. | Dimethyl sulphate | Violet. |
| 2 | do | 4-N-ethyl-N-benzyl-aminonitrosobenzene. | Benzyl bromide | Do. |

Example 12

0.5 part of the monoazo dyestuff of the constitution:

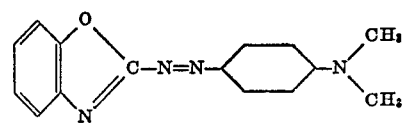

made soluble by reacting with p-toluene sulphonic acid methyl ester, is pasted with 0.5 part of 80% acetic acid and dissolved by the addition of 4000 parts of hot water. A further 1 part of 80% acetic acid, 2 parts of sodium acetate and 4 parts of a condensation agent from olein alcohol and 15 mols of ethylene oxide are added and 100 parts of polyacrylonitrile fibres are entered. The bath is heated to 90° within 30 minutes, kept for 10 minutes at this temperature and then dyeing is performed at the boil for 1 hour. The dyebath is almost completely exhausted. The goods so treated are then soaped for 15 minutes at 80° in 5000 parts of water with the addition of a sulphonated fatty acid condensation product, rinsed and dried. The polyacrylonitrile fibres are dyed in pure violet shades which have excellent fastness to washing and light.

The dyestuff to be quaternised is produced under similar conditions as that in Example 11 by condensing 2-aminobenzoxazole with 4-N.N-dimethylaminonitrosobenzene.

Similar dyeings are produced from the products given below.

| No. | Amine | Nitroso compound | Alkylating agent | Dyeing on polyacrylonitrile fabrics |
|---|---|---|---|---|
| 1 | 2-aminobenzoxazole | 4-N.N-diethylamino-nitrosobenzene. | p-Toluene sulphonic acid methyl ester. | Red-blue. |
| 2 | ___do___ | 4-N-ethyl-N-benzyl-aminonitrosobenzene. | Diethyl sulphate | Do. |

*Example 13*

0.5 part of the azo dyestuff of the formula:

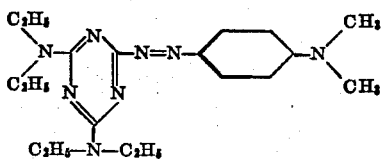

made water soluble by alkylating with diethyl sulphate is pasted with 0.5 part of 80% acetic acid and dissolved by the addition of 4000 parts of hot water. A further 1 part of 80% acetic acid, 2 parts of sodium acetate and 4 parts of a condensation agent from olein alcohol and 15 mols of ethylene oxide are added and 100 parts of polyacrylonitrile fibres are entered. The bath is heated to 90° within 30 minutes, kept at this temperature for 10 minutes and then dyeing is performed at the boil for 1 hour. The dyebath is almost completely exhausted. The goods so treated are then soaped for 15 minutes at 80° in 5000 parts of water with the addition of a sulphonated fatty acid condensation product, rinsed and dried. The polyacrylonitrile fibres are dyed in yellow shades which have excellent fastness properties.

The dyestuff given above is produced by condensing 1-N.N-dimethylamino-4-nitrosobenzene with 2-amino-4.6-bis-(diethylamino)-1.3.5-triazine in the presence of sodium amide in inert solvents. If, instead of 1-N.N-dimethylamino-4-nitrosobenzene, 1-N.N-diethylamino- or 1-N-ethyl-N-benzylamino-4-nitrosobenzene are used to form the starting dyestuff and the quaternised dyestuff is dyed onto polyacrylonitrile fibres according to the same process, then similar fast yellow shades are obtained.

What we claim is:

1. A composition of matter comprising a polyacrylonitrile fibre and, in affinitative combination therewith, an azo dye of the formula:

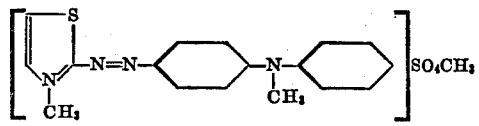

2. A composition of matter comprising a polyacrylonitrile fibre and, in affinitative combination therewith, an azo dye of the formula:

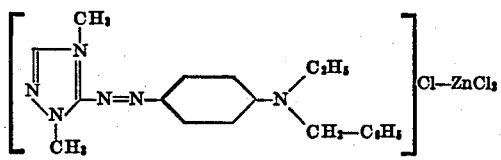

3. A composition of matter comprising a polyacrylonitrile fibre and, in affinitative combination therewith, an azo dye of the formula:

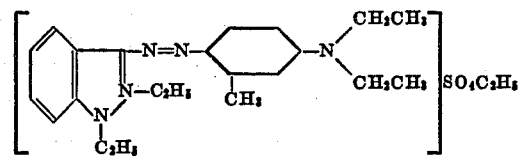

4. A composition of matter comprising a polyacrylonitrile fibre and in affinitative combinatation therewth, an azo dye of the formula:

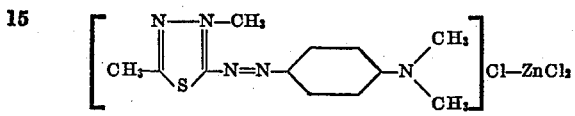

5. A composition of matter comprising a polyacrylonitrile fibre and, in affinitative combination therewith, an azo dye of the formula:

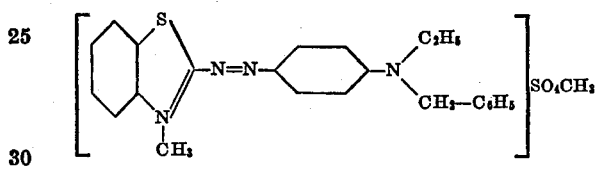

6. A composition of matter consisting of polymeric and copolymeric synthetic materials in form of fibres and threads, which consist chiefly of polyacrylonitrile and, in affinitative combination therewith, of an unsulphonated monoazo dye containing an arylazo group directly bound to an unsaturated five- to six-membered quaternary cyclammonium nucleus.

7. A composition of matter consisting of polymeric and copolymeric synthetic materials in form of fibres and threads, which consist chiefly of polyacrylonitrile and, in affinitative combination therewith, of an unsulphonated monoazo dye containing a p-aminophenylazo group directly bound to an N-alkyl-azolium nucleus.

8. Polyacrylonitrile containing at least 50% of acrylonitrile, colored by compounds which have the structure:

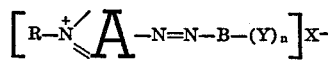

in which A is the remainder of an aromatic ring system, in which aromatic ring system the quaternary nitrogen is an integral part of a heterocyclic ring to which not more than one other ring is fused in the case where the said heterocyclic ring is fused to any other ring of said aromatic ring system, in which all rings between the quaternised nitrogen and the azo bridge which are not fused to the heterocyclic ring are linked in a continuous chain of conjugation, and through which aromatic ring system the said quaternary nitrogen is conjugated with the azo group, R is a non-aromatic organic radical, B is a carbocyclic aromatic radical of less than three rings, Y is an unionized substituent whose bond to an aromatic ring has a dipole moment greater than 1.00 Debye unit with the negative end of said dipole at the ring, said substituents being conjugated with the azo bridge, $n$ is a positive integer less than 3 and $X^-$ is an anion.

9. The polyacrylonitrile of claim 8 in which the proportion of acrylonitrile is over 85%.

10. The polyacrylonitriles of claim 9 in which there are no basic comonomers.

11. The polyacrylonitriles of claim 10 which are in fibre form.

12. Polyacrylonitrile containing at least 50% of acrylonitrile, dyed with compounds of the structure:

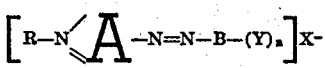

in which A is an aromatic ring system in which the quaternary nitrogen is part of a monoazine ring system of less than three rings and in which all rings not part of the said monazine ring system which separate said monazine system from the azo bridge are linked in a continuous chain of conjugation and through which aromatic ring system the said quarternary nitrogen is conjugated with the azo bridge, R is a non-aromatic organic radical, B is a carbocyclic aromatic radical of less than three rings, Y is an unionized substituent whose bond to an aromatic ring has a dipole moment greater than 1.00 Debye unit with the negative end of said dipole at the ring, said substituents being conjugated with the azo bridge, $n$ is a positive integer less than 3, and $X^-$ is an anion.

13. Polyacrylonitrile of claim 12 in which the dye has the formula

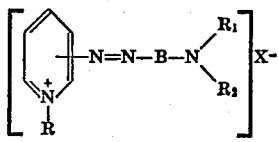

in which the azo bridge is attached to the pyridinium nucleus in a position separated from the quaternary nitrogen by an odd number of carbon atoms, B is a carbocyclic aryl radical of less than three rings, the amine nitrogen being conjugated through B with the azo bridge, R is an organic radical, $X^-$ is a non-aromatic anion, $R_1$ and $R_2$ are selected from the group consisting of hydrogen, alkyl, substituted alkyl, cycloalkyl, acyl, and heterocyclic rings in which $R_1$ and $R_2$ are joined and in which the amine nitrogen is a part, and the substituents $R_1$ and $R_2$ together with any nuclear substituents on B are chosen so that the net charge of the dye structure remains positive.

14. Polyacrylonitrile fibers containing at least 50% of acrylonitrile dyed with 1-methyl-2-(p-dimethylaminophenylazo)-pyridinium salt.

15. Polyacrylonitrile fibers containing at least 50% of acrylonitrile dyed with 1,6-dimethyl-2-(p-dimethyl-aminophenylazo)-pyridinium salts.

16. Polyacrylonitrile fibers containing at least 50% of acrylonitrile, dyed with compounds of the structure:

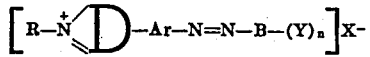

in which D is the residue of an azole ring system in which the quaternary nitrogen is the nitrogen of the azole ring, Ar is a carbocyclic ring system of less than three rings linked to the azole ring in the 2-position and to the azo bridge such that the said azo bridge is conjugated with the quaternized nitrogen, and B, Y, X, and R, and $n$ have the same definition as in claim 8.

References Cited in the file of this patent

UNITED STATES PATENTS

| | | |
|---|---|---|
| 1,833,269 | Stusser | Nov. 24, 1931 |
| 2,135,293 | Renshaw et al. | Nov. 1, 1938 |
| 2,349,899 | Bock | May 30, 1944 |
| 2,683,709 | Dickey et al. | July 13, 1954 |
| 2,822,359 | Straley et al. | Feb. 4, 1958 |
| 2,864,812 | Bossard et al. | Dec. 16, 1958 |
| 2,864,813 | Bossard et al. | Dec. 16, 1958 |

OTHER REFERENCES

Lacius, J. F.: "Dyeing Orlon Acrylic Fibers and Blends With Other Fibers," American Dyestuff Reporter; May 23, 1953; pp. 362–366.